United States Patent
Brescia, Jr.

(10) Patent No.: US 7,039,748 B2
(45) Date of Patent: May 2, 2006

(54) MEMORY MAPPED I/O BUS SELECTION

(75) Inventor: Rocco J Brescia, Jr., Newport Coast, CA (US)

(73) Assignee: Broadcom Corporation, Irvine, CA (US)

( * ) Notice: Subject to any disclaimer, the term of this patent is extended or adjusted under 35 U.S.C. 154(b) by 222 days.

(21) Appl. No.: 10/459,596

(22) Filed: Jun. 12, 2003

(65) Prior Publication Data

US 2004/0255069 A1   Dec. 16, 2004

(51) Int. Cl.
*G06F 13/20* (2006.01)

(52) U.S. Cl. .................. 710/313; 710/105; 710/113

(58) Field of Classification Search ............. 710/104, 710/105, 109, 110, 305, 306, 311, 313, 260; 703/24; 326/39, 40
See application file for complete search history.

(56) References Cited

U.S. PATENT DOCUMENTS

| | | | | |
|---|---|---|---|---|
| 5,335,338 A | * | 8/1994 | Proesel | 703/24 |
| 5,768,598 A | * | 6/1998 | Marisetty et al. | 710/260 |
| 6,188,241 B1 | * | 2/2001 | Gauthier et al. | 326/41 |
| 6,362,768 B1 | * | 3/2002 | Younis et al. | 341/155 |

OTHER PUBLICATIONS

How the PCI bus Works, Tech-Pro.*
Definition of "state machine" by Answer.com.*
Definition of "state machine" by Whatis.com.*
Definition of "Real-Time" by Wikipedia, the free Encyclopedia.*

* cited by examiner

*Primary Examiner*—Khanh Dang
(74) *Attorney, Agent, or Firm*—Sterne, Kessler, Goldstein & Fox P.L.L.C.

(57) ABSTRACT

A mechanism and method for redefining an application specific integrated circuit's I/O bus structure in real-time. The mechanism includes an address map block, a state machine block, and a bus arbitration block. At initialization, the address map is configured to divide the address space into regions and type of bus structure. When an I/O access is requested by a client (e.g., CPU, DMA controller, etc.), the request is mapped into a region and type of bus structure by the address map block. The region and type of bus structure is used by the state machine. The state machine determines the syntax and protocol for the region and type of bus. The state machine signals the bus arbitration block to grant I/O bus ownership when it is available. Once ownership is granted, I/O bus pins are defined and access is granted.

13 Claims, 9 Drawing Sheets

MEMORY MAPPED I/O BUS SELECTION

BACKGROUND OF THE INVENTION

1. Field of the Invention

The present invention is generally related to I/O bus structures. More particularly, the present invention is related to configuring in real time an ASIC I/O bus structure to communicate with multiple external devices having different bus structures.

2. Background Art

Current ASIC architectures have "hardwired" I/O bus structures. In a multi-I/O bus system, the drawbacks of a hardwired I/O bus structure may include requiring: (1) more ASIC package pins; (2) external glue logic; or (3) an external bus bridge IC.

FIG. 1A is a diagram illustrating an application-specific integrated circuit (ASIC) having multi-I/O bus structures communicating with two devices having different I/O bus structures. FIG. 1A shows ASIC 102, device 104, device 106, and device 108. ASIC 102 contains two bus structures, a local bus structure 110 (e.g., Expansion Bus Interface, or EBI) for communicating with device 104 and a PCI bus structure 112 for communicating with devices 106 and 108. Thus, ASIC 102 contains pins for a local bus 110 and pins for a PCI bus 112.

FIG. 1B shows additional detail of the ASIC 102. As shown in FIG. 1B, the ASIC 102 includes an internal bus 120, a CPU interface 126, other internal resources 128, 130, and two interfaces to external buses, e.g., an EBI bus interface 122 and a PCI bus interface 124, which connect to the EBI bus 110 and the PCI bus 112, respectively.

To support the different interfaces, i.e., EBI bus 110 and PCI bus 112, ASIC 102 is required to have more pins on the package. The more pins required for the ASIC 102, the more costly the ASIC will be to manufacture.

Accordingly, what is needed is a system and method for redefining an ASIC's I/O bus structure in real-time to enable operation in a multi-PO bus system.

BRIEF SUMMARY OF THE INVENTION

The present invention solves the above-mentioned problems by providing a system and method for redefining an ASIC's I/O bus structure in real-time to enable operation in a multi-I/O bus system with a variety of external devices having different I/O bus structures.

In one aspect of the present invention there is provided a system for managing I/O traffic in a multi-bus environment including a circuit (or glue logic) that receives address information from a microprocessor, and an interface to a plurality of buses. The interface has a set of pins the functionality of the pins is defined in real time based on the address information. The functionality can also be dynamically charged in real time based on the address.

In another aspect there is provided a method of managing I/O traffic in a multi-bus environment including receiving an address and an I/O request from a processor, and changing in real time characteristics of pins of an interface to a plurality of buses wherein the characteristics are changed based on the address.

Additional features and advantages oft he invention will be set forth in the description which follows, and in part will be apparent from the description, or may be learned by practice of the invention. The advantages of the invention will be realized and attained by the structure particularly pointed out in the written description and claims hereof as well as the appended drawings.

It is to be understood that both the foregoing general description and the following detailed description are exemplary and explanatory and are intended to provide further explanation of the invention as claimed.

BRIEF DESCRIPTION OF THE DRAWINGS

The accompanying drawings, which are included to provide a further understanding of the invention and are incorporated in and constitute a part of this specification, illustrate embodiments of the invention and together with the description serve to explain the principles of the invention. In the drawings.

Figure 1A:
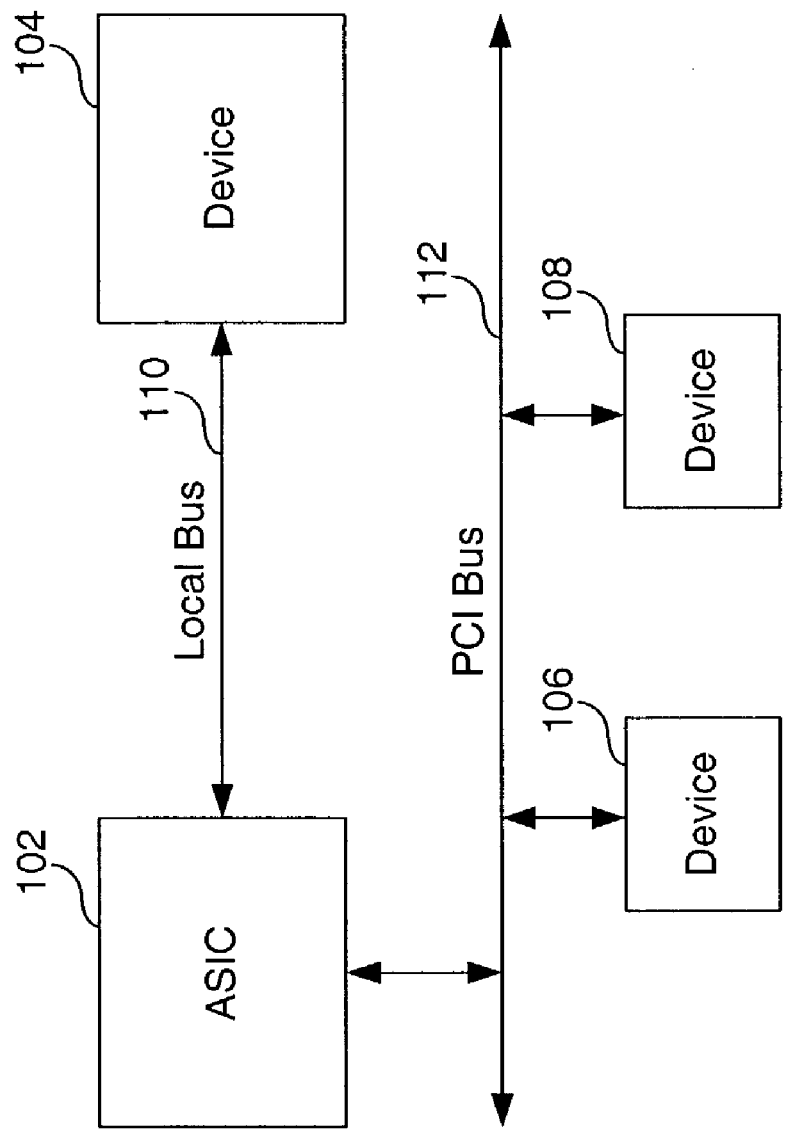
FIG. 1A is a diagram illustrating a conventional application specific integrated circuit (ASIC) having multi-I/O bus structures communicating with two devices having different I/O bus structures.
Figure 1B:
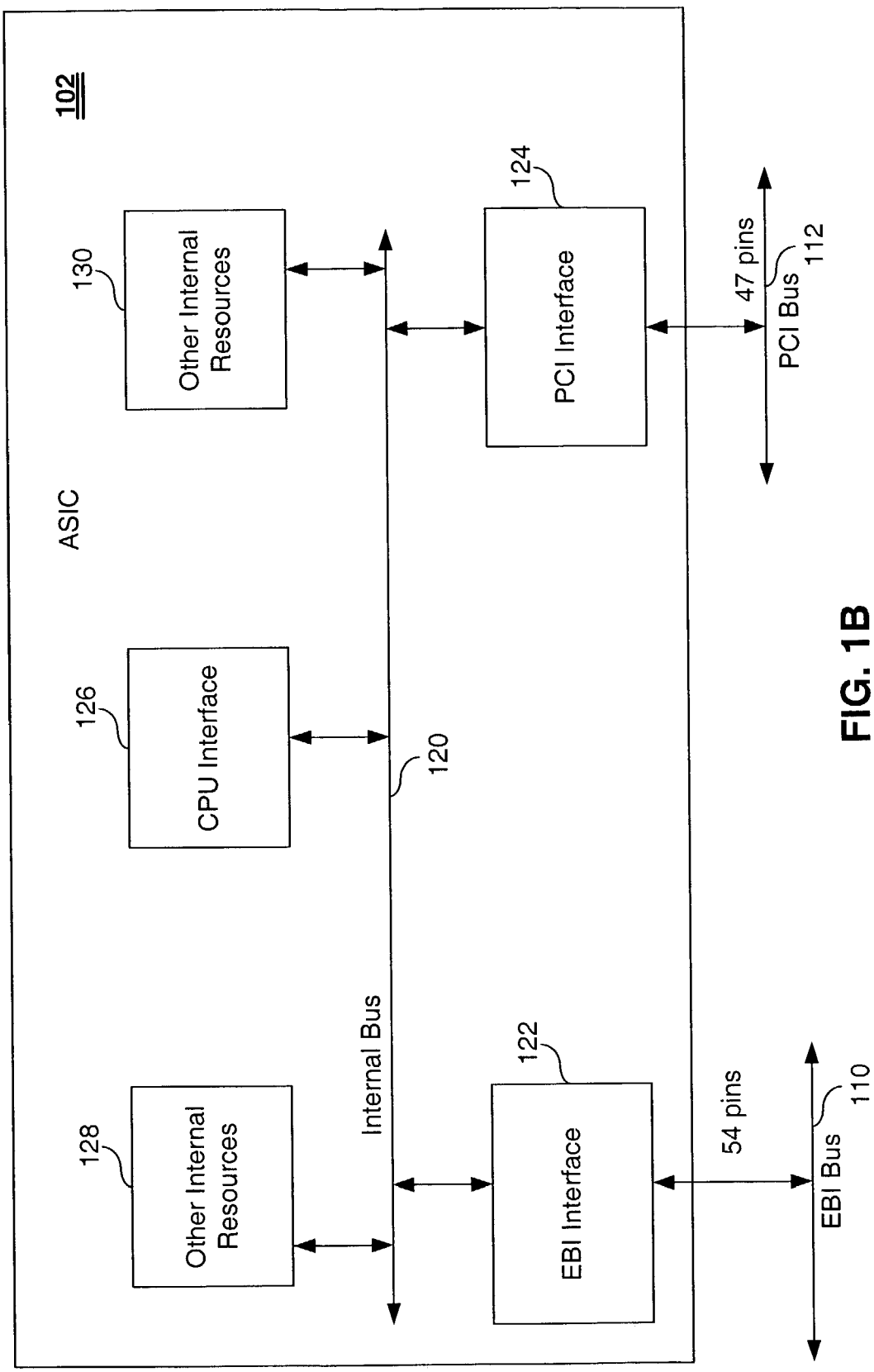
FIG. 1B shows additional detail of the ASIC of FIG. 1A.

The features and advantages of the present invention will become more apparent from the detailed description set forth below when taken in conjunction with the drawings in which like reference characters identify corresponding elements throughout. In the drawings, like reference numbers generally indicate identical, functionally similar, and/or structurally similar elements. The drawings in which an element first appears is indicated by the leftmost digit(s) in the corresponding reference number.

DETAILED DESCRIPTION OF THE INVENTION

While the present invention is described herein with reference to illustrative embodiments for particular applications, it should be understood that the invention is not limited thereto. Those skilled in the art(s) with access to the teachings provided herein will recognize additional modifications, applications, and embodiments within the scope thereof and additional fields in which the present invention would be of significant utility.

The present invention is directed to a mechanism and method for redefining an application specific integrated circuit's I/O bus structure in real-time. The mechanism includes an address map block, a state machine block, and a bus arbitration block. At initialization, the address map is configured to divide the address space into regions (i.e., used for bus addressing, used for other purposes, see generally FIG. 6) and type of bus structure (e.g., PCI, EBI, etc.). When I/O access is requested by a client (e.g., CPU, DMA controller, etc.), the request is mapped into a region and type of bus structure by the address map block. The region and type of bus structure is used by the state machine. The state machine determines the syntax and protocol for the region and type of bus. The state machine signals the bus arbitration block to grant I/O bus ownership when it is available. Once ownership is granted, I/O bus pins are defined and access is granted.

The present invention takes advantage of the fact that a processor or CPU will never simultaneously request I/O from more than one bus simultaneously. Furthermore, the address mapping in a typical system is such that the same address is never shared by devices on the different buses. This enables the sharing of resources, particularly ASIC pins, between different buses, provided the pins can be configured appropriately.

Examples of such buses include, e.g., an EBI (Expansion Bus Interface) bus and a PCI bus. The PCI bus is a 32-pin bus that includes 16 data pins. A PCI bus is frequently used to communicate with devices such as Ethernet chips, Gigabit ethernet chips, other CPUs, and various peripheral devices. The pinout of the PCI bus is shown in the table below:

TABLE 1

PCI bus interface

| PIN No. | PCI BUS |
|---|---|
| 1 | PCI_AD0 |
| 2 | PCI_AD1 |
| 3 | PCI_AD2 |
| 4 | PCI_AD3 |
| 5 | PCI_AD4 |
| 6 | PCI_AD5 |
| 7 | PCI_AD6 |
| 8 | PCI_AD7 |
| 9 | PCI_AD8 |
| 10 | PCI_AD9 |
| 11 | PCI_AD10 |
| 12 | PCI_AD11 |
| 13 | PCI_AD12 |
| 14 | PCI_AD13 |
| 15 | PCI_AD14 |
| 16 | PCI_AD15 |
| 17 | PCI_AD16 |
| 18 | PCI_AD17 |
| 19 | PCI_AD18 |
| 20 | PCI_AD19 |
| 21 | PCI_AD20 |
| 22 | PCI_AD21 |
| 23 | PCI_AD22 |
| 24 | PCI_AD23 |
| 25 | PCI_AD24 |
| 26 | PCI_AD25 |
| 27 | PCI_AD26 |
| 28 | PCI_AD27 |
| 29 | PCI_AD28 |
| 30 | PCI_AD29 |
| 31 | PCI_AD30 |
| 32 | PCI_AD31 |
| 33 | PCI_CBE0 |
| 34 | PCI_CBE1 |
| 35 | PCI_CBE2 |
| 36 | PCI_CBE3 |
| 37 | PCI_PAR |
| 38 | PCI_TRDY |
| 39 | PCI_IRDY |
| 40 | PCI_DEVSEL |
| 41 | PCI_STOP |
| 42 | PCI_RESET |
| 43 | PCI_CLK |
| 44 | PCI_FRAME |

TABLE 1-continued

PCI bus interface

| PIN No. | PCI BUS |
|---|---|
| 45 | PCI_REQ |
| 46 | PCI_GRNT |
| 47 | PCI_INT |

In the EBI bus, 16 pins are dedicated to data, 25 pins to address, and 13 pins to control signals plus additional pins for power and ground. The EBI bus is typically used for accessing memory, such as ROM, RAM and flash memory. It is also sometimes used to access other CPUs. A pinout oft he EBI bus is shown in the table below.

TABLE 2

EBI bus interface

| PIN No. | EBI BUS |
|---|---|
| 1 | EBI_DATA0 |
| 2 | EBI_DATA1 |
| 3 | EBI_DATA2 |
| 4 | EBI_DATA3 |
| 5 | EBI_DATA4 |
| 6 | EBI_DATA5 |
| 7 | EBI_DATA6 |
| 8 | EBI_DATA7 |
| 9 | EBI_DATA8 |
| 10 | EBI_DATA9 |
| 11 | EBI_DATA10 |
| 12 | EBI_DATA11 |
| 13 | EBI_DATA12 |
| 14 | EBI_DATA13 |
| 15 | EBI_DATA14 |
| 16 | EBI_DATA15 |
| 17 | EBI_ADD0 |
| 18 | EBI_ADD1 |
| 19 | EBI_ADD2 |
| 20 | EBI_ADD3 |
| 21 | EBI_ADD4 |
| 22 | EBI_ADD5 |
| 23 | EBI_ADD6 |
| 24 | EBI_ADD7 |
| 25 | EBI_ADD8 |
| 26 | EBI_ADD9 |
| 27 | EBI_ADD10 |
| 28 | EBI_ADD11 |
| 29 | EBI_ADD12 |
| 30 | EBI_ADD13 |
| 31 | EBI_ADD14 |
| 32 | EBI_ADD15 |
| 33 | EBI_ADD16 |
| 34 | EBI_ADD17 |
| 35 | EBI_ADD18 |
| 36 | EBI_ADD19 |
| 37 | EBI_ADD20 |
| 38 | EBI_ADD21 |
| 39 | EBI_ADD22 |
| 40 | EBI_ADD23 |
| 41 | EBI_ADD24 |
| 42 | EBI_ADD25 |
| 43 | EBI_RESET |
| 44 | EBI_CLK |
| 45 | EBI_WR_N |
| 46 | EBI_RD |
| 47 | EBI_DS |
| 48 | EBI_WE |
| 49 | EBI_TS |
| 50 | EBI_TA |
| 51 | EBI_TAE |
| 52 | EBI_CS |
| 53 | EBI_REQ |
| 54 | EBI_GRNT |

Thus, if an ASIC were to support both interfaces, it would need 54+47=101 pins.

In the present invention, pin arbitration is based strictly on the address. The invention allows the reuse of pins from multiple buses in real time, through use of a memory mapping block. The memory mapping block is essentially a look up table, and is based on the address.

The present invention applies to desk top systems, cable modem systems, cable set top boxes, satellite set top boxes and DSL interfaces. It is particularly advantageous in systems where the cost oft he package is a significant part of the overall cost, and the brute force approach of dedicating separate pins and interfaces for each type of bus is difficult or impractical.

It should be noted that the designer should pay particular attention to load and driving requirements, which are frequently different for different buses. For example, the EBI bus typically has lower driver requirements than the PCI bus. The PCI bus has distance requirements, which the EBI bus does not. However, the designer of the system would know in advance how many devices are expected to be connected on each bus, and can design the system accordingly.

Figure 2:
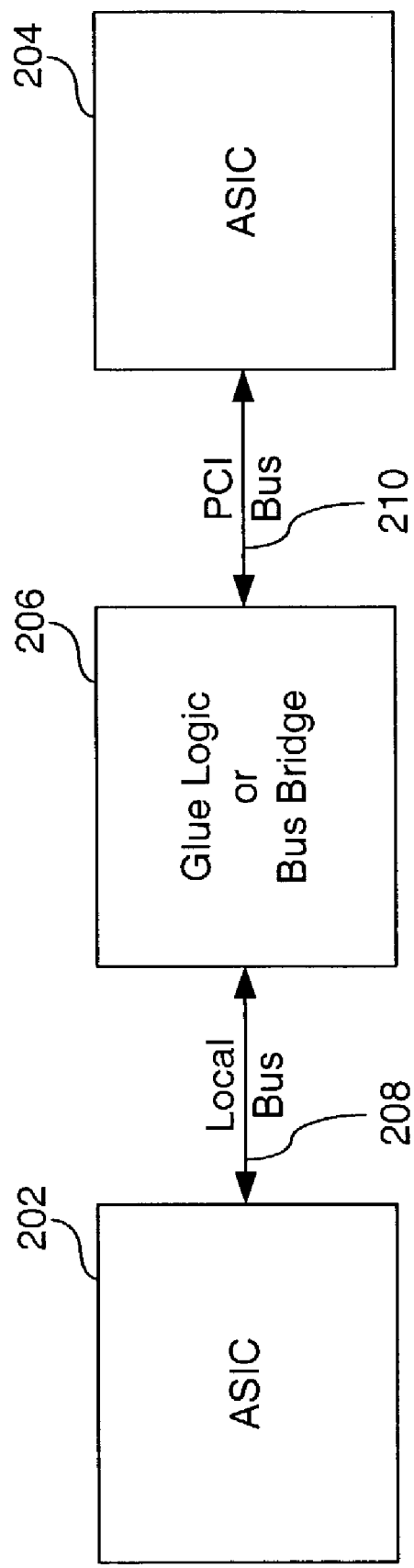
FIG. 2 is a diagram illustrating an application specific integrated circuit (ASIC) having a local bus communicating with an external device having a PCI bus via glue logic or a bus bridge IC.

In some instances, an ASIC may only contain one I/O bus structure. FIG. 2 is a diagram illustrating an application-specific integrated circuit having a local bus structure in communication with an external device having a PCI bus structure. FIG. 2 shows ASIC 102 in communication with ASIC 204. ASIC 102, as previously stated, has a local bus PO structure. ASIC 204 has a PCI bus I/O structure. In order for ASIC 202 to communicate with ASIC 204, glue logic or bus bridge 206 must be interfaced between the two ASICs 202, 204. Glue logic or bus bridge 206 communicates with ASIC 202 via local bus 208. Glue logic or bus bridge 206 communicates with ASIC 204 via PCI bus 210.

Table 3 below shows an example of a pinout of an ASIC where the PCI bus and the EBI bus share pins.

TABLE 3

Example of PCI bus and EBI bus sharing one interface

| PIN No. | EBI BUS | PCI BUS |
| --- | --- | --- |
| 1 | EBI_DATA0 | PCI_AD0 |
| 2 | EBI_DATA1 | PCI_AD1 |
| 3 | EBI_DATA2 | PCI_AD2 |
| 4 | EBI_DATA3 | PCI_AD3 |
| 5 | EBI_DATA4 | PCI_AD4 |
| 6 | EBI_DATA5 | PCI_AD5 |
| 7 | EBI_DATA6 | PCI_AD6 |
| 8 | EBI_DATA7 | PCI_AD7 |
| 9 | EBI_DATA8 | PCI_AD8 |
| 10 | EBI_DATA9 | PCI_AD9 |
| 11 | EBI_DATA10 | PCI_AD10 |
| 12 | EBI_DATA11 | PCI_AD11 |
| 13 | EBI_DATA12 | PCI_AD12 |
| 14 | EBI_DATA13 | PCI_AD13 |
| 15 | EBI_DATA14 | PCI_AD14 |
| 16 | EBI_DATA15 | PCI_AD15 |
| 17 | EBI_ADD0 | PCI_AD16 |
| 18 | EBI_ADD1 | PCI_AD17 |
| 19 | EBI_ADD2 | PCI_AD18 |
| 20 | EBI_ADD3 | PCI_AD19 |
| 21 | EBI_ADD4 | PCI_AD20 |
| 22 | EBI_ADD5 | PCI_AD21 |
| 23 | EBI_ADD6 | PCI_AD22 |
| 24 | EBI_ADD7 | PCI_AD23 |
| 25 | EBI_ADD8 | PCI_AD24 |
| 26 | EBI_ADD9 | PCI_AD25 |
| 27 | EBI_ADD10 | PCI_AD26 |
| 28 | EBI_ADD11 | PCI_AD27 |

TABLE 3-continued

Example of PCI bus and EBI bus sharing one interface

| PIN No. | EBI BUS | PCI BUS |
| --- | --- | --- |
| 29 | EBI_ADD12 | PCI_AD28 |
| 30 | EBI_ADD13 | PCI_AD29 |
| 31 | EBI_ADD14 | PCI_AD30 |
| 32 | EBI_ADD15 | PCI_AD31 |
| 33 | EBI_ADD16 | PCI_CBE0 |
| 34 | EBI_ADD17 | PCI_CBE1 |
| 35 | EBI_ADD18 | PCI_CBE2 |
| 36 | EBI_ADD19 | PCI_CBE3 |
| 37 | EBI_ADD20 | PCI_PAR |
| 38 | EBI_ADD21 | PCI_TRDY |
| 39 | EBI_ADD22 | PCI_IRDY |
| 40 | EBI_ADD23 | PCI_DEVSEL |
| 41 | EBI_ADD24 | PCI_STOP |
| 42 | EBI_ADD25 | |
| 43 | EBI_RESET | PCI_RESET |
| 44 | EBI_CLK | PCI_CLK |
| 45 | EBI_WR_N | |
| 46 | EBI_RD | |
| 47 | EBI_DS | |
| 48 | EBI_WE | |
| 49 | EBI_TS | |
| 50 | EBI_TA | |
| 51 | EBI_TAE | |
| 52 | EBI_CS | |
| 53 | | PCI_FRAME |
| 54 | | PCI_INT |
| 55 | BUS_REQ | BUS_REQ |
| 56 | BUS_GRNT | BUS_GRNT |

In this example the ASIC would need 56 pins to support both interfaces.

Figure 3:
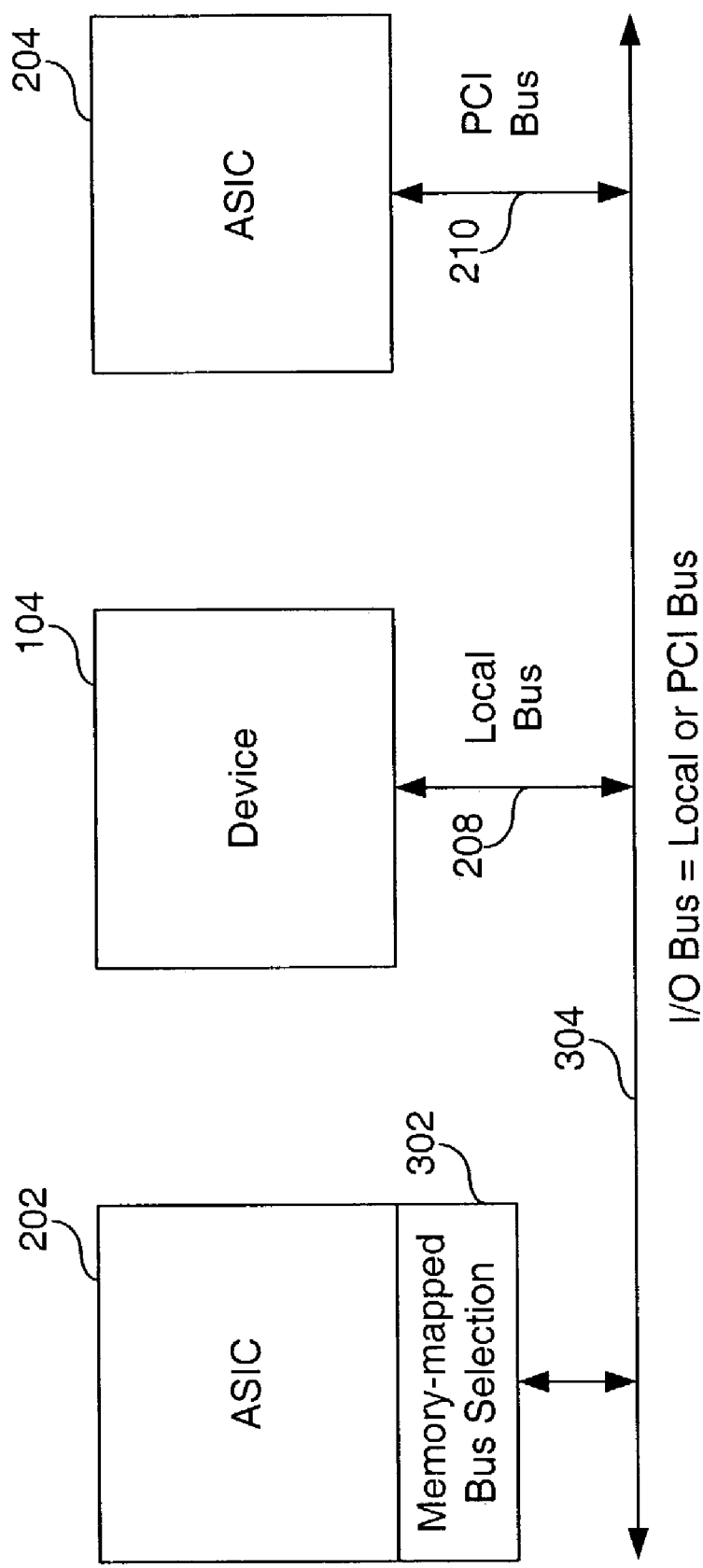
FIG. 3 is a block diagram illustrating a memory-mapped I/O bus selection for enabling an application specific integrated circuit (ASIC) to communicate with multiple I/O bus structures in real-time according to an embodiment of the present invention.

FIG. 3 is a block diagram illustrating memory map I/O bus selection for enabling an ASIC to communicate with multiple I/O bus structures in real time according to an embodiment of the present invention. As shown in FIG. 3, the present invention eliminates the need for multiple pins representative of different I/O bus structures on a single ASIC chip. The present invention also eliminates the need for glue logic or bus bridges to connect one type of I/O bus structure to another type of I/O bus structure. As shown in FIG. 3, memory mapped bus I/O bus selection 302 enables ASIC 202 to communicate via an I/O bus 304 to device 104, and also device ASIC 204. Device 104 includes a local bus 208 as where ASIC 204 communicates via a PCI bus 210. Memory mapped I/O bus selection 302 enables ASIC chip 202 to have a single PO bus structure that communicates via I/O bus 304 to either device 104 or ASIC 204. Memory mapped I/O bus selection 302 changes the definition of I/O bus 304 in real time depending upon which device or ASIC ASIC 204 is communicating with. For example, if ASIC 202 is communicating with device 104, wherein device 104 has a local bus, I/O bus 304 is defined in real time to be a local bus. Alternatively, if ASIC 202 is communicating with ASIC 204, memory-mapped I/O bus selection defines I/O bus 304 to be a PCI bus in order that ASIC 204 communicates with ASIC 202. Thus, when ASIC 202 needs to be a PCI bus for comminations with ASIC 204, the definition of the bus is changed in real time. This eliminates the need for numerous extra pins on ASIC 202. Thus, the present invention enables one set of pins on an ASIC chip to support a plurality of I/O bus structures.

Figure 4A:
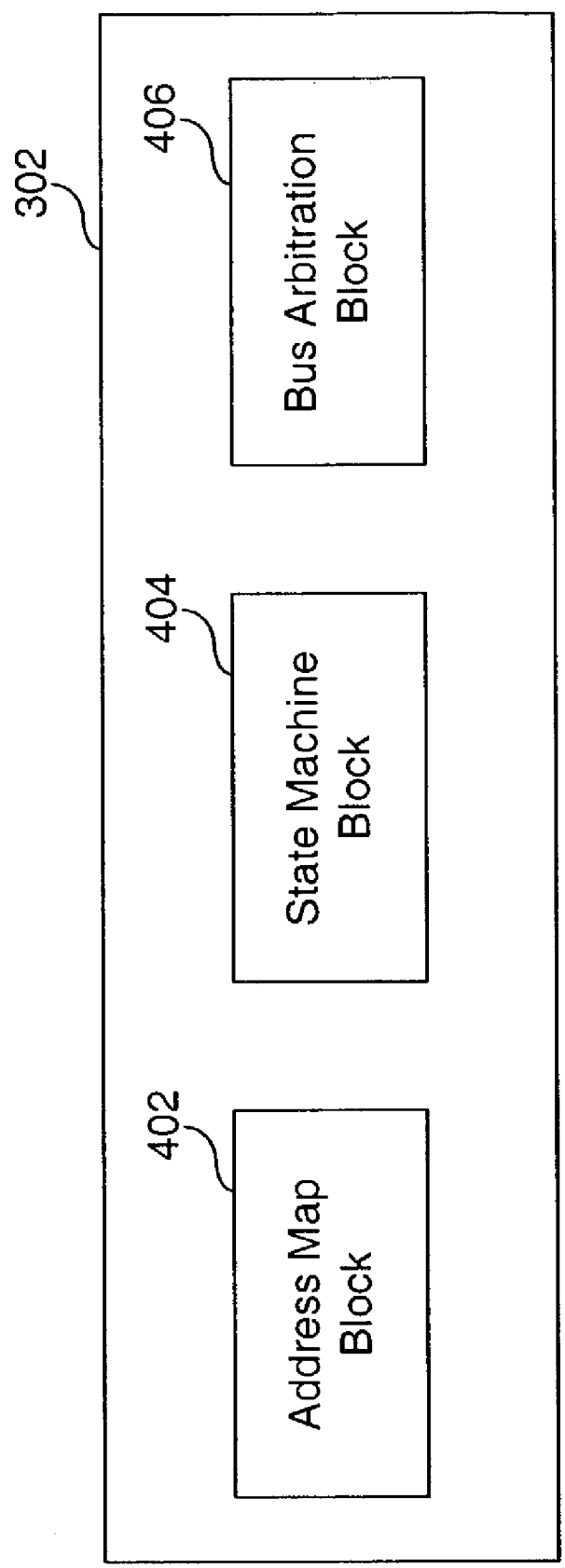
FIG. 4A is a diagram illustrating a more detailed block diagram of a memory-mapped I/O bus selection according to an embodiment of the present invention.

FIG. 4A is a more detailed block diagram of memory-mapped I/O bus selection 302. Memory-mapped I/O bus selection 302 comprises an address map block 402, a state machine block 404 and a bus arbitration block 406. Address map block 402 is coupled to state machine 404 and state machine block 404 is coupled to bus arbitration 406.

Address map block 402 is used to configure an address map into regions and types of bus structures. For example, such bus structures may include, but are not limited to, a PCI bus, an EDI bus, a SCSI bus, a MIPS bus, a 68K-type bus, etc.

State machine block 404 is used to determine the syntax and protocol for a region and type of bus upon receipt of I/0 access by a client. Bus arbitration block 406 is used to enable a bus artibrateur to grant bus ownership.

Figure 4B:
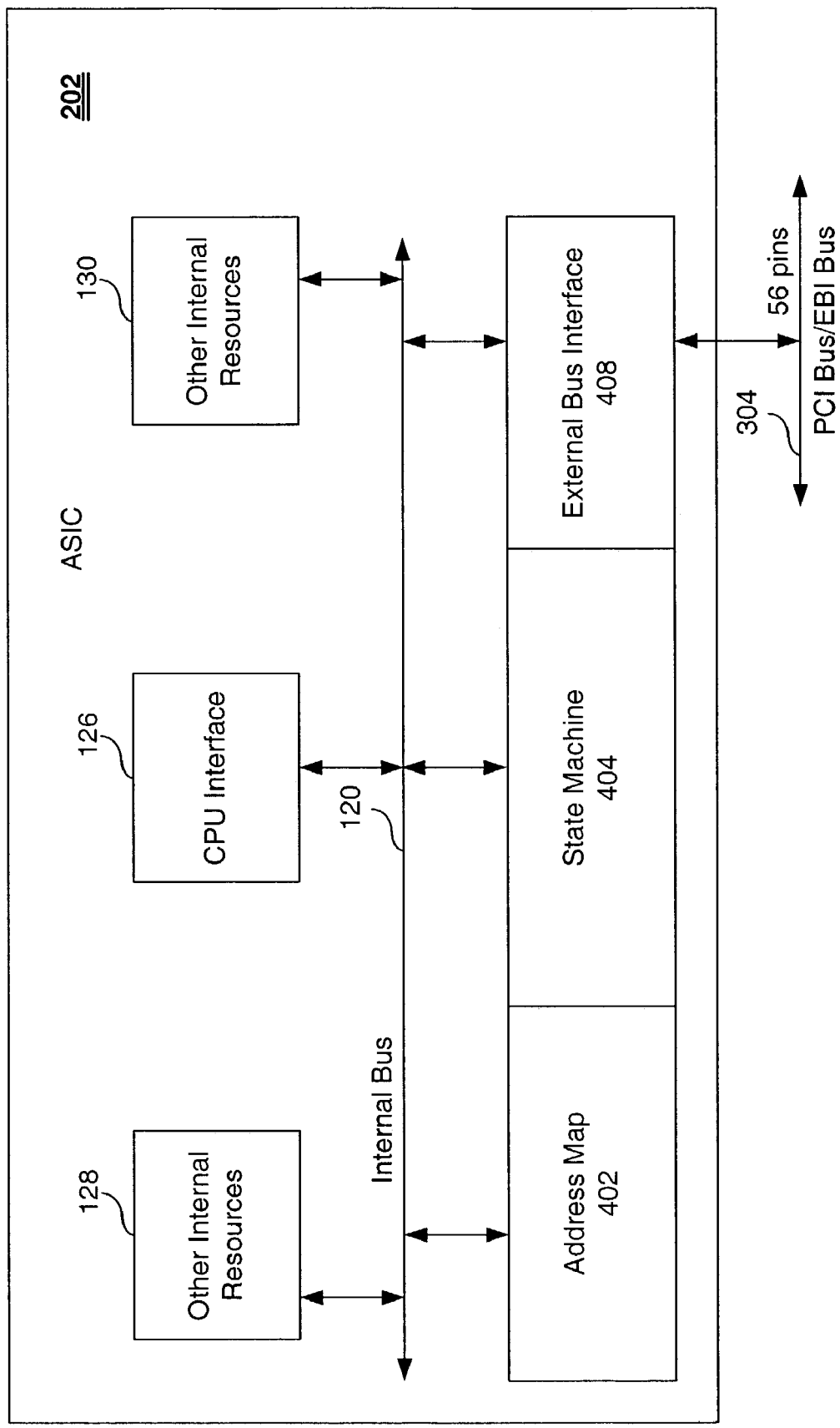
FIG. 4B shows additional detail of the ASIC of the present invention.

FIG. 4B shows additional detail oft he ASIC 202 oft he present invention, with the PCI bus and the EPI bus used as examples. As shown in FIG. 4B, the ASIC 202 includes an internal bus 120, which is connected to a CPU interface 126 and other internal resources 128, 130. The internal bus 120 is also connected to the address map block 402, the state machine 404, and an external bus interface 408. The external bus interface 408 is connected to a bus 304, which can be configured (in this example) as either a PCI bus or an EBI bus, depending on the address provided to the ASIC 202.

Figure 5:
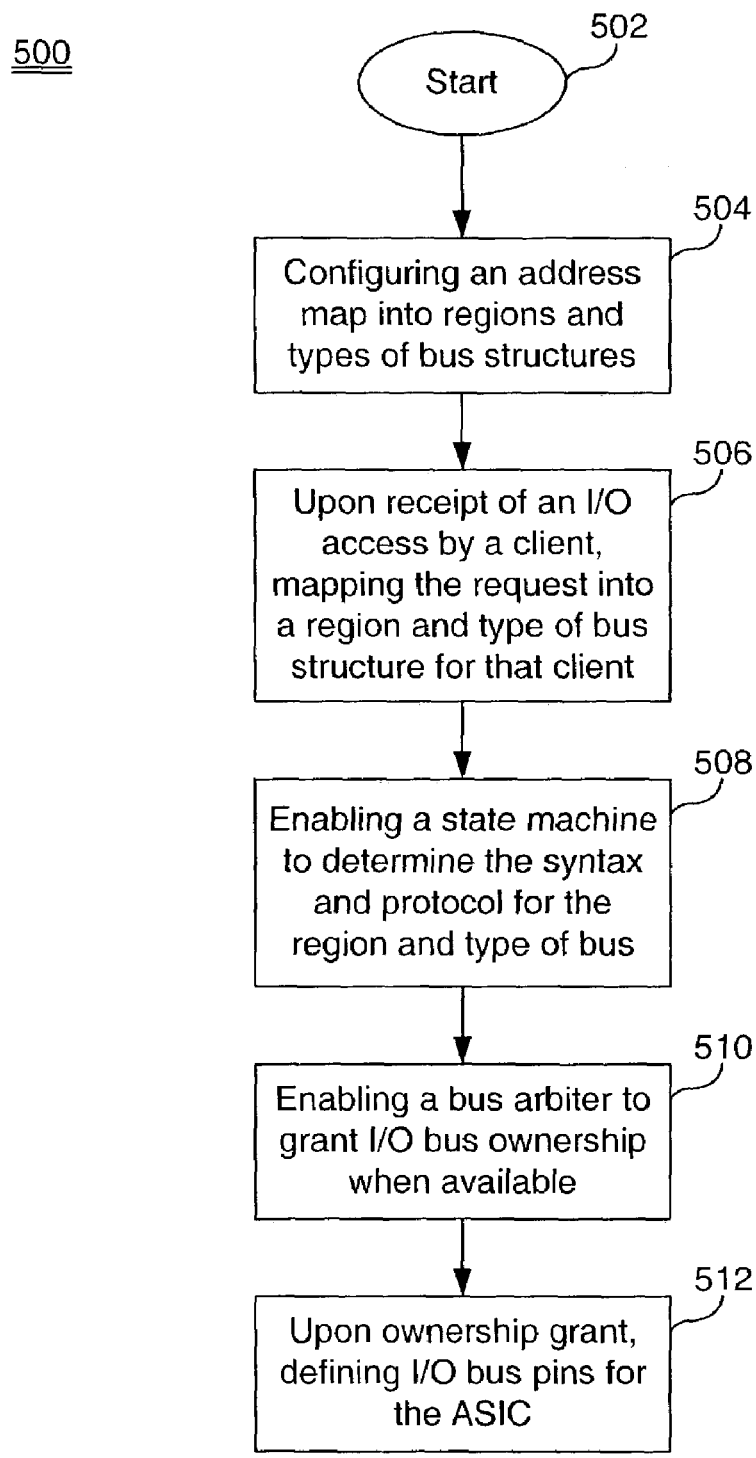
FIG. 5 is a flow diagram illustrating a method for redefining an I/O bus structure in real-time according to an embodiment of the present invention.

FIG. 5 is a flow diagram illustrating a method for redefining an I/0 bus structure in real time according to an embodiment of the present invention. The process begins with step 502 (start), where the process immediately proceeds to step 504.

In step 504, at initialization, the address map block 402 is configured to divide the address space into region and types of bus structures. The process then proceeds to step 506.

In step 506, when an P/O access if requested by a client, the request is mapped into a region and type of bus structure by the address map block 402. A client may include a CPU, a DMA controller, etc. The process then proceeds to step 508.

In step 508, the region and type of bus structure is used by the state machine 404 to determine the syntax and protocol for the region and type of bus. The state machine 404 then signals the bus arbitration block 406 to grant I/O bus ownership when it is available in step 510. The process then proceeds to step 512.

In step 512, once ownership is granted, I/O bus pins of the ASIC are defined and access is granted.

Figure 6:
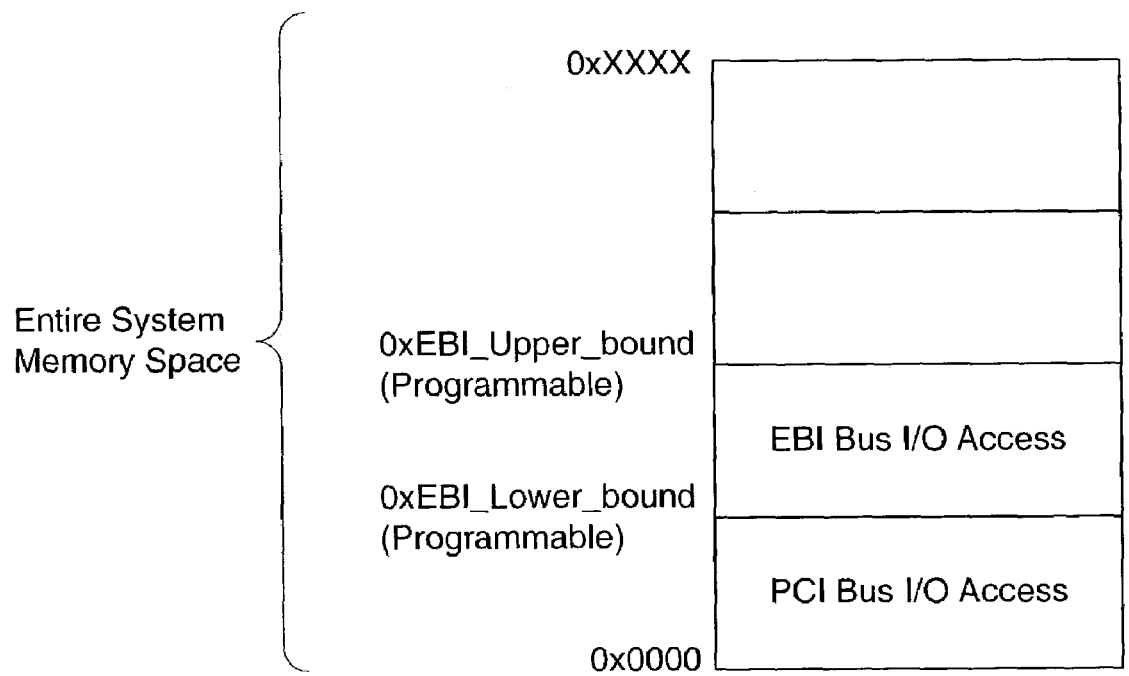
FIG. 6 illustrates memory space allocation of the system.

FIG. 6 illustrates the memory space allocation of the ASIC 202. In the example shown in FIG. 6, the lowest addresses are reserved for the PCI bus, access, the next lowest for the EBI bus, and so forth.

Figure 7:
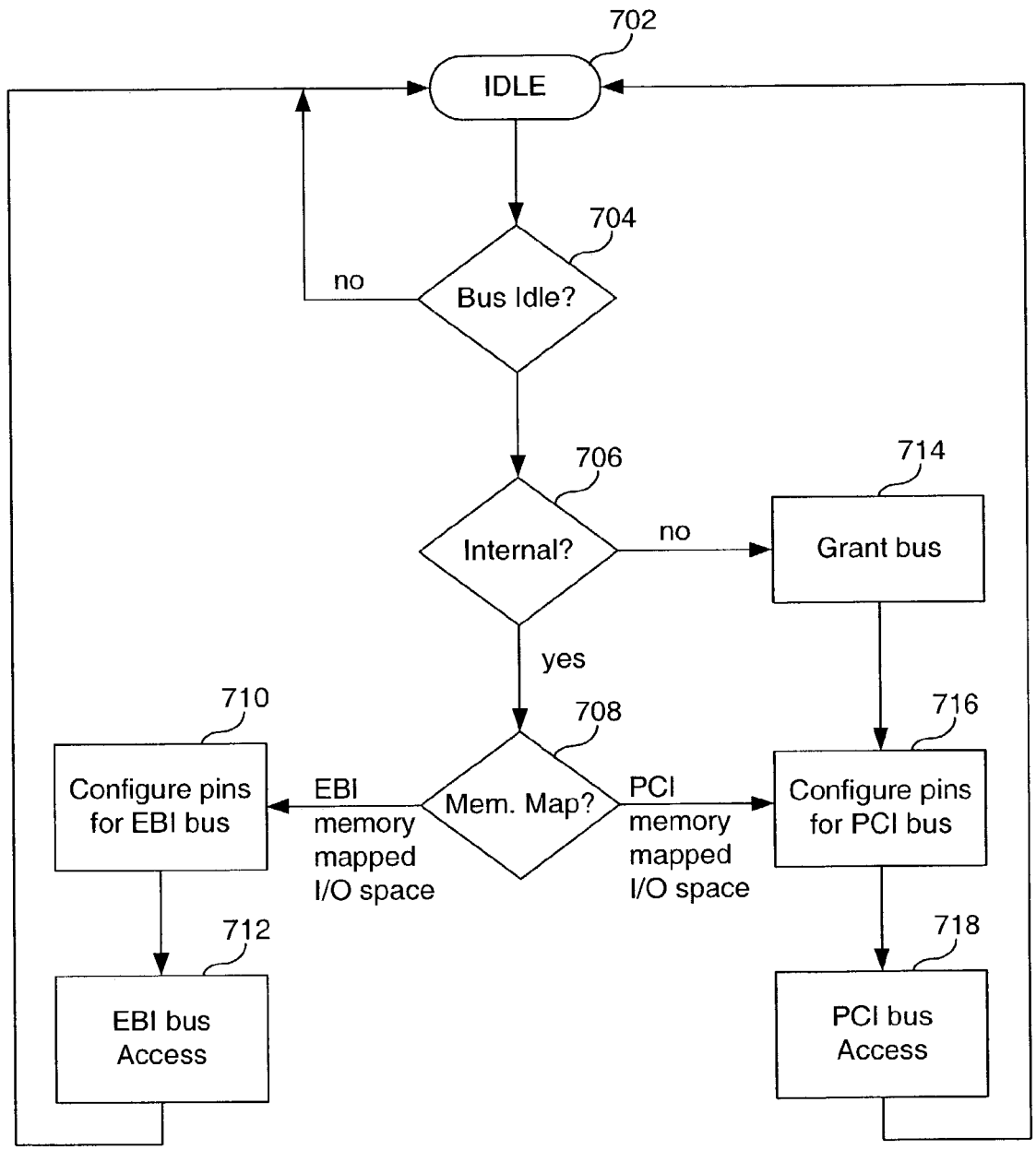
FIG. 7 shows operation of the state machine of the present invention in flowchart form.

FIG. 7 illustrates additional detail of operation of the state machine 404. As shown in FIG. 7, normally the state machine 404 is in an idle state (step 702). Upon an external bus request, the state machine 404 can either return to idle (step 702) or continue to process the request (step 706). If the request is for an internal bus, the next decision is whether a memory mapped I/O decision is required (step 708). If the address maps to the EBI bus, the pins of the ASIC pinout should be configured for the EBI bus (step 710). The EBI bus is then accessed (step 712). If the request is for the PCI bus, based on the address, the pins of the ASIC 202 are configured for PCI bus operation (step 716). (In this example, only two types of buses are supported, but in actuality, other types of buses may be present). The PCI bus is then accessed (step 718). After steps 712 or 718, the state machine returns to idle state.

If in step 706, the request is not for an internal bus, the bus is granted (step 714). The state machine 404 then returns to the idle state.

It will be apparent to those skilled in the art that various modifications and variations can be made to the present invention without departing from the spirit or scope of the invention. Thus, it is intended that the present invention cover the modifications and variations of this invention provided they come within the scope of the appended claims and their equivalents.

What is claimed is:

1. A computer system comprising:
   an application specific integrated circuit (ASIC) having a shared bus pin; and
   an interface coupled to the ASIC, the interface comprising:
      an address map block having a plurality of address regions, each of the plurality of address regions containing information about a predetermined type of bus structure,
      a state machine configured to receive the information from one of the plurality of address regions and to reconfigure the shared bus pin based on the information received, and
      a bus arbitration block coupled to the state machine that grants one of a plurality of devices access to the shared bus pin once the reconfiguration is completed.

2. The computer system of claim 1, further comprising:
   a plurality of buses coupled to the plurality of devices, one of the plurality of buses being coupled to the shared bus pin.

3. The computer system of claim 2, wherein the plurality of buses includes a peripheral component interface (PCI) bus and an Expansion Bus Interface (EBI) bus.

4. The computer system of claim 2, wherein the plurality of buses includes any combination of a PCI bus, an IDE bus, a SCSI bus, a 68K-type bus and an EBI bus.

5. The computer system of claim 2, wherein the information is a bus syntax and protocol for the predetermined type of bus structure.

6. The computer system of claim 5, wherein the shared bus pin is reconfigured by assigning the bus syntax and protocol of the predetermined type of bus structure to the shared bus.

7. A system for managing I/O traffic in a multi-bus environment comprising:
   a plurality of communication buses;
   a plurality of devices coupled to the plurality of communication buses;
   an application specific integrated circuit (ASIC) having a shared bus pin; and
   an interface circuit coupled to the shared bus pin and to one of the plurality of communication buses, the interface circuit comprising:
      an address map block having a plurality of address regions that correspond with a plurality of bus structures,
      a state machine coupled to the address map block that assigns a syntax and protocol to the shared bus pin based on one of the plurality of address regions and one of the plurality of corresponding bus structures from the address map block, and
      a bus arbitration circuit coupled to the state machine that grants one of the plurality of devices ownership of the shared bus pin once the syntax and protocol assignment is completed.

8. The system of claim 7, wherein the plurality of buses includes a peripheral component interface (PCI) bus and an Expansion Bus Interface (EBI) bus.

9. The system of claim 7, wherein the plurality of buses includes any combination of a PCI bus, an IDE bus, a SCSI bus, a 68K-type bus and an EBI bus.

10. A method for managing I/O traffic in a multi-bus environment comprising:
   receiving a communication request from a device through one of a plurality of buses;
   matching the device's request to one of a plurality of address regions using an address map block, each of the plurality of address regions corresponding to a predetermined type of bus structure;
   assigning a bus syntax and protocol to a shared bus pin of an application specific integrated circuit (ASIC) based on the matched address region and the predetermined type of bus structure using a state machine; and
   granting the device access to the shared bus pin after the bus syntax and protocol assignment step is completed using a bus arbitration circuit.

11. The method of claim 10, further comprising:
   initializing an address map into address regions with corresponding type of bus structures.

12. The method of claim 10, wherein the plurality of buses includes a PCI bus and an EBI bus.

13. The method of claim 10, wherein the plurality of buses includes any combination of a PCI bus, an IDE bus, a SCSI bus, a 68K-bus and an EBI bus.

* * * * *